UNITED STATES PATENT OFFICE.

WILLIAM C. GEER, OF AKRON, OHIO, ASSIGNOR TO THE B. F. GOODRICH COMPANY, OF NEW YORK, N. Y., A CORPORATION OF NEW YORK.

RUBBER ARTICLE AND METHOD OF MAKING THE SAME.

1,382,774. Specification of Letters Patent. Patented June 28, 1921.

No Drawing. Application filed February 28, 1920. Serial No. 362,131.

*To all whom it may concern:*

Be it known that I, WILLIAM C. GEER, a citizen of the United States, residing at Akron, in the county of Summit and State of Ohio, have invented a certain new and useful Rubber Article and Method of Making the Same, of which the following is a specification.

This invention relates to the manufacture of vulcanized rubber articles, and more particularly solid or cushion rubber tires, and its principal objects are to preserve in a greater degree the nerve or toughness of the rubber and avoid the tendency which is sometimes observed in the finished article to strip, peel, tear or break away, owing to the molecular structure, commonly known as the grain, imparted during the process of forming the rubber material for building the article. Solid or cushion tires, for example, are laid up in the raw state, either by circumferential windings of strips of calendered rubber stock, in which case the tearing or stripping which occurs in the use of the vulcanized tire in general follows the circumferential grain of the individual laminations, or by extruding the raw stock from a tubing machine, in which case the flow of the rubber imparts a longitudinal grain having a generally circular arrangement cross-wise of the tire, somewhat resembling the rings in a tree trunk, and the stripping or tearing generally follows this ring-like formation. Tubed tires, while not so subject to stripping as laminated ones, are objectionable on account of having a splice or joint where the ends meet, and often showing a weakness at this joint.

My present invention effectively breaks up the grain, thus greatly increasing the serviceability and life of the article, and it retains a greater degree of toughness and nerve in the rubber by requiring less preliminary mastication such as rolling, calendering or tubing the stock. As an incident to the preferred mode of carrying out the invention, there is also a high degree of compactness imparted to the vulcanized article, and other incidental advantages which will be apparent from the succeeding description.

In the preferred mode of practising my invention in the case of a solid or cushion tire, I make up the raw rubber compound in the usual or any preferred manner, including, besides rubber, enough sulfur for vulcanization and, if required, accelerators, fillers, or other ingredients. This compound is preferably mixed on an ordinary roller mill and run off as a thick sheet or slab, but it may be masticated and extended in any suitable manner. I then form the raw vulcanizable rubber compound into lumps which may be of any suitable size, as, for example, the equivalent in volume of a cube whose sides are about half an inch long. The external shape of the lumps is not especially important, and they may be regular or irregular, and uniform or non-uniform, that is, more than one size or more than one shape may be employed. To obtain these lumps, a sheet, slab or mass of rubber may be broken up in any suitable way, preferably in the warm state, as by slitting it into strips and chopping off these strips into short lengths. This cuts out the usual calendering or tubing step and thus retains a tougher stock, but it will be understood that I do not wholly exclude a tubing operation or a second mastication at some suitable stage.

These lumps of vulcanizable rubber compound are then pressed together, preferably while the rubber is still warm from the previous operation or when it has been warmed up again to increase its plasticity, so as to consolidate the individual pieces into a single mass, eliminate the voids and squeeze out the air from between the lumps. A vacuum may be applied during the squeezing step so as to assist in eliminating the air. The squeezing together of the lumps is performed after arranging them in a form roughly approximating the form of the finished article, which, for a tire, would be an annular form, and it may be accomplished in a special die, pressing apparatus or mold heated in a suitable manner and having a rather wide range of adjustment from its open to its closed position, so as to accommodate the relatively large dimensions of the mass of lumps when loose or uncompressed and reduce the same to the extent corresponding to full compression and elimination of interspaces, this die or mold being preferably used only for the compressing operation and not for vulcanizing. A very high degree of adhesion and compactness is obtained in this way.

The next and final step is to mold and vulcanize the article, while under suitable confinement or pressure, preferably in a mold of the ordinary form. In the case of a solid tire, the soft-vulcanizing compound in the body or tread of the tire may be treated in the described manner, or both it and the hard-vulcanizing compound of the tire base may be so treated if a hard-rubber base is employed, and the application of the rubber to the metal rim may take place at any appropriate stage in the course of manufacture.

The result of my process is a vulcanized solid tire or other article in which the grain of the rubber is effectively broken up and the tearing, stripping, or breaking away of the rubber in the article when subjected to use is to a large extent or completely overcome. It will be evident that the article is made up of concreted or welded lumps vulcanized into a unitary mass wherein there is no continuity of grain in any direction, coextensive with the dimensions of the article.

I am aware that it is not new to press together lumps of raw non-vulcanizing rubber to make a cylinder from which "cut sheets" are obtained, or to heat and press together pieces of vulcanized rubber stock, or to join together formed bars, pieces or strips of raw, vulcanizable rubber stock to make a built-up article having a continuity of grain, and I do not broadly claim any of those methods.

I claim:

1. The method of making rubber articles which comprises mixing rubber with a vulcanizing ingredient by a suitable masticating operation and giving it an extended form, then without further mastication dividing the rubber body into relatively-small lumps, pressing said lumps together into a mass having a form approximating that of the finished article, and vulcanizing said article.

2. The method of making rubber articles which comprises mixing rubber with sulfur by a suitable masticating operation and giving it the form of a relatively-thick sheet or slab, slitting said sheet into strips and dividing the strips into lumps, aggregating the lumps in a loose mass, compressing said mass to concrete the lumps and eliminate voids, and vulcanizing the compressed mass in the desired form of a finished article.

3. The method of making solid rubber tires which comprises masticating rubber with a vulcanizing ingredient and giving it an extended form, dividing the extended rubber body into lumps, aggregating the lumps in a loose mass having an annular form approximating that of the tire, compressing said loose mass to consolidate the lumps and substantially eliminate the interspaces, and vulcanizing the consolidated mass in tire form.

4. The method of making rubber articles which comprises masticating rubber with sulfur and extending it, dividing the extended rubber body into lumps, aggregating the lumps in a loose mass, compressing said mass in a suitable apparatus having a molding cavity which when closed approximates the form of the finished article, removing the consolidated mass from said apparatus and vulcanizing it in its final form in a different apparatus.

5. The method of making solid rubber tires which comprises masticating rubber with sulfur, extending it in the form of a relatively-thick sheet, slitting said sheet into strips, dividing the strips into lumps, compressing said lumps in an annular form approximating that of the tire, removing the consolidated mass from the compressing device and finally molding and vulcanizing it in tire form.

6. A formed article comprising a compacted, promiscuously-aggregated mass comprising relatively-small lumps of previously unvulcanized but vulcanizable rubber composition united by vulcanization.

7. A vehicle tire of the solid cushion type comprising an annular, compacted mass of promiscuously-arranged, relatively-small lumps united by vulcanization and consisting largely of rubber which has been vulcanized only in so uniting the lumps.

In witness whereof I have hereunto set my hand this 20th day of February, 1920.

WILLIAM C. GEER.